United States Patent [19]

Altermatt et al.

[11] 4,211,688
[45] Jul. 8, 1980

[54] PROCESS FOR DYEING HIGH-MOLECULAR ORGANIC MATERIAL IN THE MELT

[75] Inventors: Hans Altermatt, Reinach; Arnold Wick, Therwil, both of Switzerland

[73] Assignee: Ciba-Geigy Corporation, Ardsley, N.Y.

[21] Appl. No.: 913,159

[22] Filed: Jun. 6, 1978

[30] Foreign Application Priority Data

Jun. 14, 1977 [CH] Switzerland .................. 7297/77

[51] Int. Cl.² .................. C08K 5/08; C08K 5/34
[52] U.S. Cl. .................. 260/40 P; 106/204; 260/37 N; 260/42.21
[58] Field of Search .............. 544/187, 188; 260/40 P, 260/42.21, 37 N; 106/204

[56] References Cited

U.S. PATENT DOCUMENTS

| | | | |
|---|---|---|---|
| 1,897,428 | 2/1933 | Hentrich et al. | 544/187 X |
| 3,839,332 | 10/1974 | Moergeli | 544/187 X |
| 3,935,208 | 1/1976 | Altermatt | 544/188 X |
| 3,972,881 | 8/1976 | Altermatt | 260/249 |

FOREIGN PATENT DOCUMENTS

953155 3/1964 United Kingdom.

*Primary Examiner*—Sandra M. Person
*Attorney, Agent, or Firm*—Joseph F. DiPrima

[57] ABSTRACT

Process for the dyeing of high-molecular organic material in the melt, in which process there is used as coloring substance an anthraquinone compound of the formula

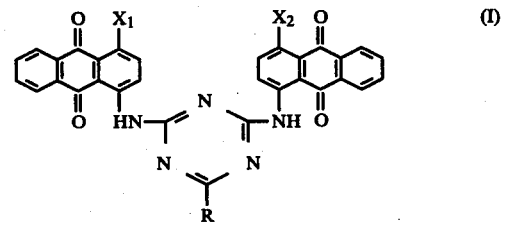

wherein R represents straight-chain or branched-chain alkyl having 1 to 17 C atoms, $X_1$ and $X_2$ represent hydrogen or benzoylamino, or $X_1$ represents hydrogen and $X_2$ represents benzoylamino.

10 Claims, No Drawings

PROCESS FOR DYEING HIGH-MOLECULAR ORGANIC MATERIAL IN THE MELT

It has been found that anthraquinone derivatives of the formula

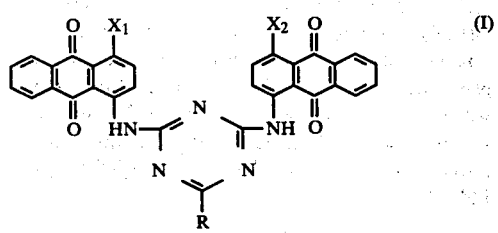

wherein R represents straight-chain or branched-chain alkyl having 1 to 17 C atoms, $X_1$ and $X_2$ represent hydrogen or benzoylamino, or $X_1$ represents hydrogen and $X_2$ represents benzoylamino, are excellently suitable for dyeing high-molecular organic material, particularly polyesters, in the melt.

Of particular interest are those anthraquinone derivatives wherein R represents alkyl having 1 to 5 C atoms, and $X_1$ and $X_2$ represent hydrogen or benzoylamino, as well as mixtures thereof, or synthesis mixtures thereof which can contain as additional components the corresponding anthraquinone derivatives in which $X_1$ represents hydrogen and $X_2$ represents benzoylamino.

The anthraquinone derivatives of the formula I or synthesis mixtures thereof to be used according to the invention can be obtained (a) by condensing 1 mol of a 2-alkyl-4,6-dihalo-1,3,5-triazine or 2-alkyl-4,6-dihalo-1,3,5-triazine mixture with 2 mols of a 1-aminoanthraquinone or 1-aminoanthraquinone mixture; or preferably (b) by condensing 1 mol of an alkylguanamine or alkylguanamine mixture with 2 mols of a 1-haloanthraquinone or 1-haloanthraquinone mixture, according to the process of the Swiss Patent specification No. 485,644, in the presence of an addition compound of a copper-I-halide and a tertiary base as catalyst.

Suitable starting compounds for production according to process variant (a) are for example the following aminoanthraquinones:

1-aminoanthraquinone,
1-amino-4-benzoylaminoanthraquinone or mixtures thereof which can be condensed for example with the following triazine compounds:

2-methyl-4,6-dichloro-1,3,5-triazine,
2-ethyl-4,6-dichloro-1,3,5-triazine,
2-n-propyl-4,6-dichloro-1,3,5-triazine,
2-iso-propyl-4,6-dichloro-1,3,5-triazine,
2-n-butyl-4,6-dichloro-1,3,5-triazine,
2-iso-butyl-4,6-dichloro-1,3,5-triazine,
2-tert-butyl-4,6-dichloro-1,3,5-triazine,
2-amyl-4,6-dichloro-1,3,5-triazine,
2-heptyl-4,6-dichloro-1,3,5-triazine, and
2-nonyl-4,6-dichloro-1,3,5-triazine.

The following haloanthraquinones can be used as starting materials for production according to process variant (b):

1-chloroanthraquinone,
1-bromoanthraquinone,
1-chloro-4-benzoylaminoanthraquinone,
1-bromo-4-benzoylaminoathraquinone or mixtures thereof which can be reacted with alkylguanamines. These can be produced in a known manner by condensation of aliphatic carboxylic acid nitriles with dicyandiamide. The following may be mentioned as examples of such alkylguanamines:

2,4-diamino-6-methyl-1,3,5-triazine,
2,4-diamino-6-ethyl-1,3,5-triazine,
2,4-diamino-6-n-propyl-1,3,5-triazine,
2,4-diamino-6-isopropyl-1,3,5-triazine,
2,4-diamino-6-n-butyl-1,3,5-triazine,
2,4-diamino-6-n-pentyl-1,3,5-triazine,
2,4-diamino-6-isopentyl-1,3,5-triazine,
2,4-diamino-6-n-heptyl-1,3,5-triazine,
2,4-diamino-6-n-nonyl-1,3,5-triazine,
2,4-diamino-6-n-undecyl-1,3,5-triazine,
2,4-diamino-6-n-tridecyl-1,3,5-triazine, and
2,4-diamino-6-n-heptadecyl-1,3,5-triazine.

The condensation reaction is performed in the presence of the customary acid-binding agents, such as the alkali metal salts of weak acids, for example sodium acetate, sodium carbonate or potassium carbonate.

The addition compounds of copper-I-halides with tertiary bases, to be used as catalysts, are known compounds. Addition compounds of copper-I-iodide are preferably used. Tertiary bases which may be mentioned are for example: triethylamine, N-methylpiperidine, N-methylmorpholine or dimethylaniline, especially however pyridine bases, i.e. pyridine and related compounds, such as the picolines, lutidines, collidines, quinoline, isoquinoline and $\alpha$, $\alpha'$-dipyridyls. These addition compounds are readily formed by dissolving the copper-I-iodide in the pyridine base, the latter being advantageously used in excess. In contrast to copper-I-iodide, the addition compounds are readily soluble in organic solvents, and can therefore be easily separated from the condensation products obtained.

The colouring substances to be used according to the invention have good solubility on application in the polymer melt, without any special preparation being necessary, and yield fully satisfactory and brilliant dyeings. Furthermore, they are distinguished by outstanding thermostability in the polymeric substrates, except polyamides, and can be used for melt dyeing a variety of high-molecular organic materials, such as cellulose ether, celluose ester, cellulose acetate, celluose nitrate and polyurethane, and particularly polyolefins, such as polyethylene, polypropylene, polyacrylate and polystyrene, and copolymers thereof, such as ABS, especially however polyesters. If the colouring substances used are synthesis mixtures, such as are obtained from condensation of a mixture of 1-aminoanthraquinone and 1-amino-4-benzoylamino-anthraquinone with a 2,4-dichloro-6-alkyl-1,3,5-triazine or 2,4-dichloro-6-alkyl-1,3,5-triazine mixture, or from condensation of a mixture of a 1-haloanthraquinone and 1-halo-4-benzoylaminoanthraquinone with a 2,4-diamino-6-alkyl-1,3,5-triazine or 2,4-diamino-6-alkyl-1,3,5-triazine mixture, there are obtained mixed shades between yellow and bluish red which are characterised by a surprisingly high degree of purity for shades resulting from mixtures of this type.

Except where otherwise stated in the following Examples, 'parts' denote parts by weight, percentages are percent by weight, and temperatures are in degrees Centigrade.

EXAMPLES 1–20

25 parts of 1-chloroanthraquinone together with 7 parts of 2,4-diamino-6-ethyl-1,3,5-triazine and 12.5 parts of anhydrous sodium carbonate in 350 parts of nitrobenzene are heated, after the addition of a solution of 2.5 parts of copper-I-iodide in 17.5 parts of picoline, to 180°–185°, and refluxed at this temperature for 4 hours with stirring. The mixture is then allowed to cool to 60°; the colouring substance which has precipitated is filtered off with suction, and successively washed with nitrobenzene, alcohol and water. The moist product is suspended in 2000 parts of hot water and, after the addition of 300 parts of concentrated nitric acid, stirring is maintained at 80° for 30 minutes; the product is subsequently filtered off hot under suction, thoroughly washed with hot water, and dried at 80° in vacuo to give 24 parts of the colouring substance of the formula

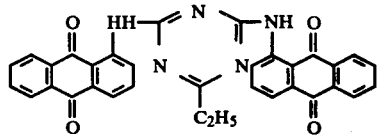

which dyes polyester in the melt in brilliant, fast yellow shades.

The colouring substances listed in the following Table behave in an analogous manner; these colouring substances, apart from the prior known derivatives of 2,4-diamino-6-methyl-1,3,5-triazine, are produced by the procedure described in Example 1.

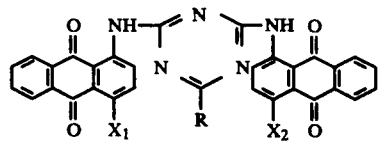

| Example | R | X | Shade in PES |
|---|---|---|---|
| 2 | $CH_3$ | H | yellow |
| 3 | $CH_3$ | benzoylamino | red |
| 4 | $C_2H_5$ | benzoylamino | red |
| 5 | $C_3H_7$ | H | yellow |
| 6 | $C_3H_7$ | benzoylamino | red |
| 7 | $CH(CH_3)_2$ | H | yellow |
| 8 | $CH(CH_3)_2$ | benzoylamino | red |
| 9 | $C_5H_{11}$ | H | yellow |
| 10 | $C_5H_{11}$ | benzoylamino | red |
| 11 | $(CH_2)_2CH(CH_3)_2$ | H | yellow |
| 12 | $(CH_2)_2CH(CH_3)_2$ | benzoylamino | red |
| 13 | $C_7H_{15}$ | H | yellow |
| 14 | $C_9H_{19}$ | H | yellow |
| 15 | $C_{11}H_{23}$ | H | yellow |
| 16 | $C_{13}H_{27}$ | H | yellow |
| 17 | $C_{17}H_{35}$ | H | yellow |
| 18 | $C_{17}H_{35}$ | benzoylamino | red |

Compared with the 2,4-bis-(1-anthraquinoyl)-amino-6-phenyl-1,3,5-triazine described in the German Auslegeschrift No. 1,283,542 for the melt dyeing of polyester (PES), the colouring substances according to the present invention have better solubility in polymers.

The alkylguanamines required for producing the above colouring substances are produced as described in the following in the case of 2,4-diamino-6-n-heptadecyl-1,3,5-triazine:

265 parts of stearic acid nitrile, 100 parts of dicyandiamide and 10 parts of potassium hydroxide powder in 500 ml of ethylene glycol monoethyl ether are heated to boiling within 45 minutes, and maintained under the reflux for 10 hours. The reaction mixture is subsequently allowed to cool and is then left to stand for 12 hours at room temperature. The product which has precipitated is filtered off with suction, washed with water, and dried at 80° in vacuo to leave 226 parts of a white powder. Recrystallisation from alkohol yields pure 2,4-diamino-6-n-heptadecyl-1,3,5-triazine, m.p. 114°–116°.

EXAMPLE 19

A non-delustred polyethylene terephthalate granulate suitable for producing fibres is shaken, in a closable vessel, together with 1% of the colouring substance according to Example 1 for 15 minutes on a shaking machine. The uniformly dyed granules are spun on a melt spinning machine (285°±3°, retention time in the spinning machine about 5 minutes) into filaments which are drawn and spooled on a draw twister. By virtue of the solubility of the dye in polyethylene terephthalate, there is obtained a brilliant yellow dyeing which is characterised by outstanding fastness to light and by excellent fastness to washing, dry-cleaning, cross-dyeing and sublimation, as well as by good fastness to rubbing, and by high resistance to staining on other fabrics after or during thermofixing at 180°.

EXAMPLE 20

A mixture of 18.8 parts of 1-chloroanthraquinone and 9.3 parts of 1-chloro-4-benzoylaminoanthraquinone is condensed, according to the data given in Example 1, with 7.65 parts of 2,4-diamino-6-isopropyl-1,3,5-triazine. There is obtained a colouring-substance mixture consisting of three components, which mixture dyes PES in the melt, according to Example 19, in deeply coloured, pure orange shades having excellent fastness properties.

By suitable variation of the mixture ratios of 1-chloroanthraquinone and 1-chloro-4-benzoylaminoanthraquinone, there can be obtained in a corresponding manner colouring substances which cover the range of shades from reddish-yellow to approaching bluish-red.

| Example | Parts of 1-chloro-anthraquinone | Parts of 1-chloro-4-benzoylamino-anthraquinone | Shade in PES |
|---|---|---|---|
| 21 | 23.8 | 1.8 | golden yellow |
| 22 | 22.1 | 4.4 | yellowish orange |
| 23 | 12.5 | 18.7 | reddish orange |
| 24 | 6.3 | 27.9 | scarlet |
| 25 | 2.5 | 33.5 | red |

EXAMPLES 26–35

In a manner corresponding to that described in Example 20, the following mixtures of 1-chloroanthraquinone and 1-chloro-4-benzoylaminoanthraquinone are condensed with the listed 2,4-diamino-6-alkyl-1,3,5-triazines to give the corresponding colouring-substance mixtures.

| Example | 2,4-Diamino-6-alkyl-1,3,5-triazine Alkyl group | Parts | 1-Choro-anthraquinone Parts | 1-Chloro-4-benzoylamino-anthraquinone Parts | Shade in PES |
| --- | --- | --- | --- | --- | --- |
| 26 | —CH₃ | 6.3 | 18.7 | 9.3 | yellowish-orange |
| 27 | —CH₃ | 6.3 | 12.5 | 18.7 | reddish-orange |
| 28 | —CH₃ | 6.3 | 6.3 | 28 | scarlet |
| 29 | —CH₃ | 6.3 | 2.5 | 33.5 | red |
| 30 | —C₂H₅ | 7 | 24.3 | 1.4 | reddish-yellow |
| 31 | —C₂H₅ | 7 | 18.7 | 9.3 | yellowish-orange |
| 32 | —C₂H₅ | 7 | 6.3 | 28 | scarlet |
| 33 | n-C₃H₇ | 7.7 | 6.3 | 28 | scarlet |
| 34 | n-C₄H₉ | 8.4 | 2.5 | 33.5 | red |
| 35 | —(CH₂)₂CH(CH₃)₂ | 9 | 23.8 | 1.8 | golden yellow |

EXAMPLE 36

A mixture of 18.8 parts of 1-chloroanthraquinone and 9.3 parts of 1-chloro-4-benzoylaminoanthraquinone is reacted, in the manner described in Example 1, with a mixture of 3.12 parts of 2,4-diamino-6-methyl-1,3,5-triazine and 3.5 parts of 2,4-diamino-6-ethyl-1,3,5-triazine. There is thus obtained a colouring-substance mixture which dyes PES in the melt, according to Example 19, in orange shades.

EXAMPLE 37

A non-delustered polypropylene granulate suitable for producing fibres is mixed with 1% of the colouring substance according to Example 17 in a closable vessel for 5 minutes in a tumbler mixer. The powdered granules are spun on an extruder melt spinning machine at 280° into the form of filaments, which are then drawn in the ratio of 1:4 on a draw twister and spooled. By virtue of the solubility of the colouring substance in the polymer, there is thus obtained, without any special preparation of the colouring substance, such as is required for the incorporation of a pigment, a homogeneous clear yellow dyeing.

We claim:

1. A process for the dyeing of high molecular organic material in the melt which comprises incorporating, as a colouring substance, an anthraquinone compound of the formula

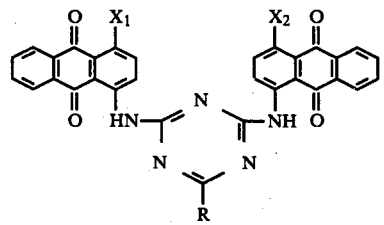

wherein R represents straight-chain or branched-chain alkyl having 1 to 17 C atoms, $X_1$ and $X_2$ represent hydrogen or benzoylamino, $X_1$ represents hydrogen and $X_2$ represents benzoylamino or mixtures thereof into said high molecular organic material.

2. A process for dyeing cellulose ether or cellulose ester, cellulose acetate or cellulose nitrate, polyurethanes, polyesters or polyolefins, or copolymers thereof, in the melt according to claim 1, in which process there is used a colouring substance of the formula I.

3. A process for dyeing polyesters in the melt according to claim 1, in which process there is used a colouring substance of the formula I.

4. A process according to claim 1, in which process the colouring substance used is an anthraquinone compound of the formula I wherein R represents alkyl having 1 to 5 C atoms, and $X_1$ and $X_2$ represent hydrogen.

5. A process according to claim 4, in which process the colouring substance used is an anthraquinone compound of the formula I wherein R represents methyl or ethyl and $X_1$ and $X_2$ represent hydrogen.

6. A process according to claim 1, in which process the colouring substance used is an anthraquinone compound of the formula I wherein R represents alkyl having 1 to 5 C atoms, and $X_1$ and $X_2$ represent benzoylamino.

7. A process according to claim 6, in which process the colouring substance used is an anthraquinone compound of the formula I wherein R represents ethyl or isopropyl and $X_1$ and $X_2$ represent benzoylamino.

8. A process according to claim 1, wherein the colouring substances used are synthesis mixtures of anthraquinone compounds of the formula I, such as are obtained by condensing a mixture of 1-aminoanthraquinone and 1-amino-4-benzoylaminoanthraquinone with a 2,4-dichloro-6-alkyl-1,3,5-triazine or 2,4-dichloro-6-alkyl-1,3,5-triazine mixture; or by condensing a mixture of a 1-haloanthraquinone and 1-halo-4-benzoylaminoanthraquinone with a 2,4-diamino-6-alkyl-1,3,5-triazine or 2,4-diamino-6-alkyl-1,3,5-triazine mixture.

9. A process according to claim 8, wherein the colouring substance used is a synthesis mixture of anthraquinone compounds of the formula I which is obtained by condensing a mixture of 12.5 parts by weight of 1-chloroanthraquinone and 18.7 parts by weight of 1-chloro-4-benzoylaminoanthraquinone with 6.3 parts by weight of 2,4-diamino-6-methyl-1,3,5-triazine.

10. A polyester material dyed in the melt by the process according to claim 1.

* * * * *